United States Patent
Anderson et al.

(10) Patent No.: US 9,383,008 B2
(45) Date of Patent: Jul. 5, 2016

(54) GEAR SHIFT MECHANISM

(71) Applicant: Dana Automotive Systems Group, LLC, Maumee, OH (US)

(72) Inventors: Scott V. Anderson, Paw Paw, MI (US); Michael Z. Creech, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 59 days.

(21) Appl. No.: 14/160,849

(22) Filed: Jan. 22, 2014

(65) Prior Publication Data

US 2014/0216189 A1 Aug. 7, 2014

Related U.S. Application Data

(60) Provisional application No. 61/759,750, filed on Feb. 1, 2013.

(51) Int. Cl.
*B60K 20/00* (2006.01)
*F16H 63/32* (2006.01)
*F16H 61/32* (2006.01)
*B60K 17/344* (2006.01)
*F16H 63/30* (2006.01)

(52) U.S. Cl.
CPC ............. *F16H 61/32* (2013.01); *B60K 17/344* (2013.01); *F16H 63/304* (2013.01); *F16H 2063/325* (2013.01); *Y10T 74/19251* (2015.01); *Y10T 74/2003* (2015.01)

(58) Field of Classification Search
CPC ..... F16H 59/041; F16H 59/042; F16H 61/32; F16H 63/32; F16H 63/30; F16H 63/304; F16H 2061/326; F16H 2063/325; F16H 2063/322; F16H 2063/3093; F16H 2200/0004; B60K 17/344
USPC ............... 74/335, 473.37, 439, 473.1, 473.12
See application file for complete search history.

(56) References Cited

U.S. PATENT DOCUMENTS

| | | | | |
|---|---|---|---|---|
| 6,082,514 | A * | 7/2000 | Averill | 192/69.42 |
| 2003/0066368 | A1 * | 4/2003 | Koerber et al. | 74/335 |
| 2009/0266188 | A1 * | 10/2009 | Kawamoto et al. | 74/89.38 |
| 2010/0038164 | A1 * | 2/2010 | Downs et al. | 180/248 |
| 2010/0116076 | A1 * | 5/2010 | Hoering et al. | 74/473.37 |

FOREIGN PATENT DOCUMENTS

| | | | |
|---|---|---|---|
| CA | 2471544 | A1 * | 12/2005 |
| EP | 0072990 | A1 | 3/1983 |
| EP | 1001193 | A2 | 5/2000 |
| EP | 1174647 | A1 * | 1/2002 |
| FR | 2825439 | A1 | 12/2002 |
| GB | 1268847 | A | 3/1972 |

OTHER PUBLICATIONS

English translation of foreign document, EP 1174647 A1.*
Dictionary definition, "Dictionary.com".*

* cited by examiner

*Primary Examiner* — Ha D Ho
(74) *Attorney, Agent, or Firm* — Marshall & Melhorn, LLC (57) ABSTRACT

A shifting mechanism has a shift fork. The shift fork has upper and lower arms connected by an upright portion. The upright portion defines a pivot axis for the fork. The mechanism also has a clutch collar that is connected to the shift fork. The shift fork is connected to gearing and a motor to pivot the fork and thus the clutch collar into and out of engagement with a clutch.

15 Claims, 7 Drawing Sheets

GEAR SHIFT MECHANISM

RELATED APPLICATIONS

This application claims priority to, and the benefit from, U.S. Patent Application Ser. No. 61/759,750 filed on Feb. 1, 2013, which is incorporated by reference in its entirety.

BACKGROUND OF THE INVENTION

Four wheel drive for vehicles can be advantageous in certain circumstances, like when additional traction is needed because of surface conditions, or during cornering or acceleration. Driving all four of the wheels and their associated components, however, is not often required during most driving conditions and it results in increased fuel consumption.

It is preferable that two of the four wheels be selectively engaged only when required at least to avoid the increase in fuel consumption. It is known to directly drive two wheels of a vehicle and then to use a power take off unit to selectively drive the other two wheels. Typically, a shift fork and a sliding clutch, among other components, are used to selectively engage and disengage the rear wheels at the power take off unit.

Figure 1:
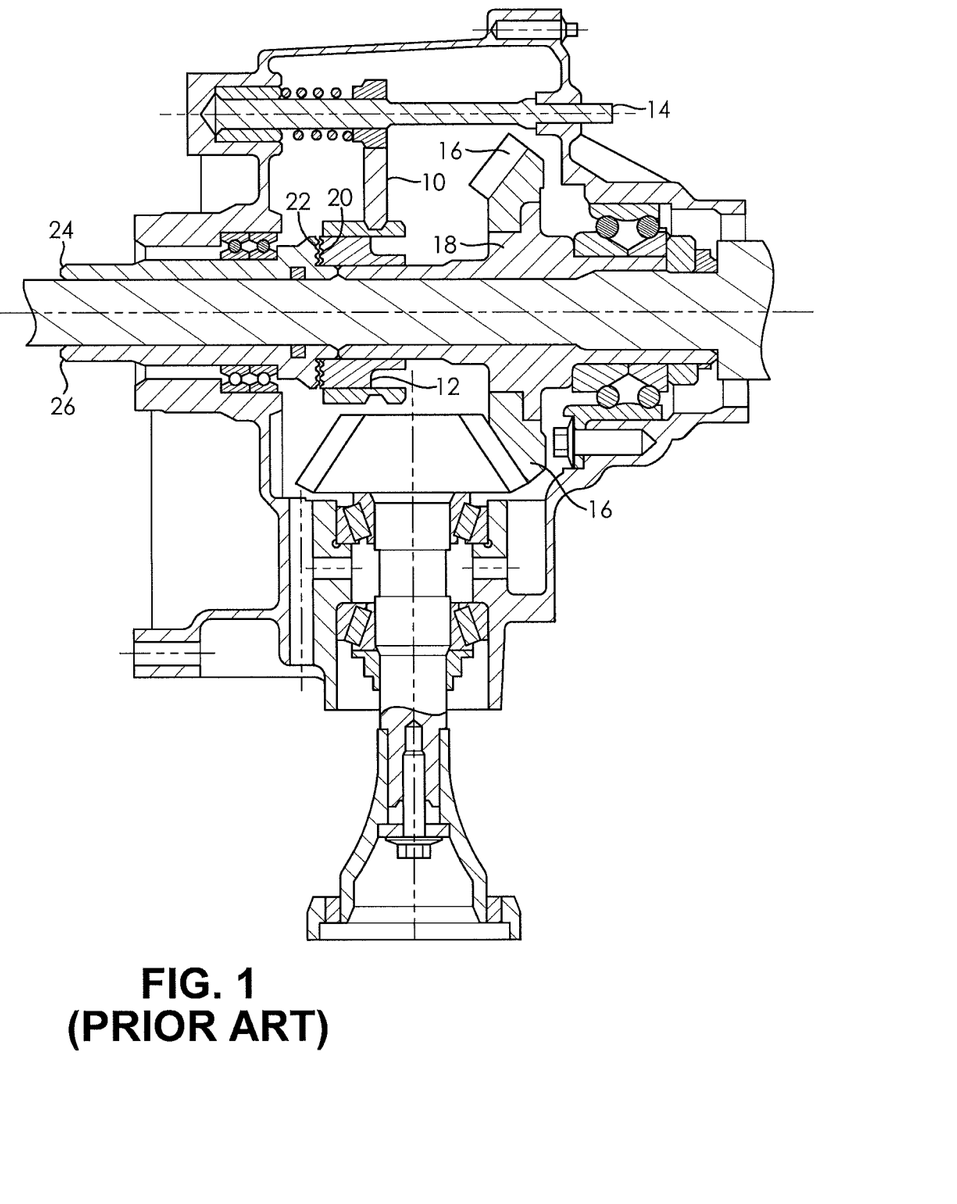
FIG. 1 is one embodiment of a prior art shift mechanism.

One embodiment of a prior art shift fork 10 and sliding clutch 12 is depicted in FIG. 1. The shift fork 10 is moved in the axial direction by a linear push rod or piston 14. The shift fork 10 is connected to the sliding clutch 12. The sliding clutch 12 slides on, and rotates with, a source of rotation. In the depicted in embodiment, the sliding clutch 12 is mounted for axial movement on a ring gear 16. The ring gear 16 is driven by a shaft 18.

The clutch 12 has a set of teeth 20 on one of its side surfaces. The shift fork 10 selectively moves the sliding clutch 12, and its teeth 20, axially into and out of engagement with a set of teeth 22 on an adjacent shaft 24. The shaft 24 is connected to a drive shaft 26, such as an axle half shaft. As shown in the figures, the adjacent shaft 24 is concentric about the drive shaft 26.

The above-described system has a number of drawbacks. First, it requires a large amount of space for the sliding clutch 12 to be translated in the axial direction. Second, it requires a relatively large and powerful device to move the entire fork 10 and the entire clutch 12. Third, because the clutch 12 is moved, the shift fork 10 and other components must be robust, and thus heavy, to withstand the repeated loading and unloading. Fourth, the response time for the clutch 12 to be engaged or disengaged is slow often because of the large amount of time needed for the shift fork 10 to axially move the clutch 12 adequately for engagement or disengagement with the adjacent set of teeth 22.

SUMMARY OF THE INVENTION

A shifting mechanism has a shift fork with a lower lever arm, an upright portion and an upper arm. The lower lever arm has a toothed arc-shaped end. The upright portion defines a pivot axis for the shift fork. An axially slidable clutch collar, at least a portion of which is concentrically surrounded by the unitary shift fork, is also provided. The toothed arc-shaped end of the shift fork is engaged with at least one reduction gear, which is connected to a shift motor. The shift motor causes the fork to move about its axis to bring the collar into and out of engagement with a clutch.

BRIEF DESCRIPTION OF THE FIGURES

The above will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 2:
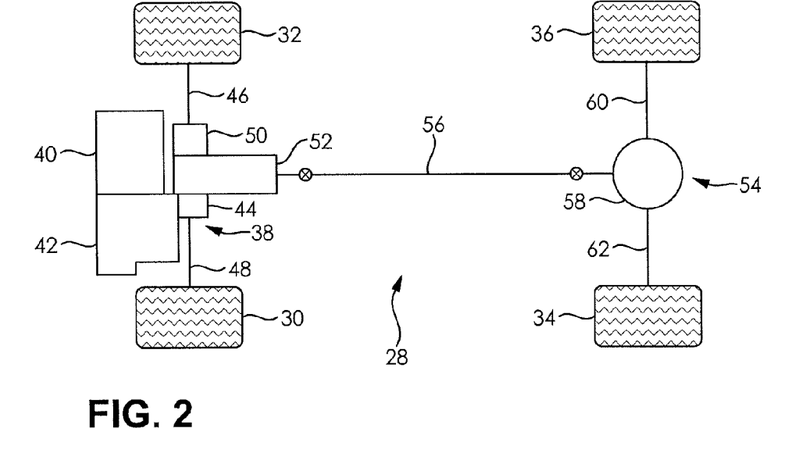
FIG. 2 is a schematic of a vehicle driveline.

FIG. 2 schematically depicts a drivetrain 28 of an all-wheel drive (AWD) or four-wheel-drive (4WD) motor vehicle. The AWD drivetrain 28 comprises a pair of front drive wheels 30 and 32, a pair of rear drive wheels 34 and 36 and a front-wheel-drive (FWD) transaxle unit 38. The FWD transaxle unit 38 is operatively connected to a prime mover 40, such as an internal combustion engine, electric motor, etc.

The FWD transaxle unit 38 is a drive setup in which a power transmission 42, a final drive, and a front differential assembly 44 are combined into a single unit connected directly to the prime mover 40; these components do not have to be in a single unit. The FWD transaxles are commonly used in front wheel drive motor vehicles. The power transmission 42 is commonly known in the art as a mechanical unit containing a manual or automatic change-speed gear system and associated actuating machinery. An output from the power transmission 42 is connected to the front differential assembly 44 through the final drive. The front differential assembly 44 is drivingly connected to right-hand and left-hand front output axle shafts 46 and 48, respectively. In turn, the output axle shafts 46 and 48 drive the front wheels 30 and 32, through suitable coupling means, such as constant-velocity joints (not shown).

As illustrated, the FWD transaxle unit 38 further includes an integrated torque-coupling device 50 and power take-off unit (PTU) 52. The torque-coupling device 50 is provided for selectively restricting differential rotation of the front differential assembly 44, i.e. of the output axle shafts 46 and 48, and the PTU 52 is adapted for use in a full-time AWD system and is operable to transfer drive torque from the prime mover 40 and the power transmission 42 at a predetermined distribution ratio to the rear wheels 34, 36 of a rear drive axle 54 through a propeller shaft 56, a rear differential assembly 58 and rear axle shafts 60 and 62.

Although, the preferred embodiment of the present invention is described with the reference to the front-wheel-drive transaxle unit, it will be appreciated that the present invention is equally applicable to a rear-wheel-drive transaxle unit. The components described below may also be adapted to any other known power take off units for vehicles or other machinery.

FIGS. 3-6 depict one embodiment of a PTU 52. An input shaft 64, rotationally driven by the transmission 42, is depicted. The input shaft 64 drives a pinion gear (not shown), which is in meshed engagement with a ring gear (not shown).

In a preferred embodiment, the ring and pinion gears are in a hypoid arrangement, but other connections between the ring and pinion gears are permissible. The pinion gear and ring gear are located within a power-take-off unit housing 66.

The ring gear is connected to a power take off output shaft 68. The power take off output shaft 68 is oriented substantially transversely to the input shaft 64 in the depicted embodiment. The ring and pinion gears transfer rotational power coming from the input shaft 64, which is aligned along a first axis 70, to the power take off output shaft 68, which is perpendicular to the input shaft 64, and aligned along a second axis 72.

A shift motor 74 is located within the power take off housing 66. The motor 74 may be an electric motor, but pneumatic, hydraulic, mechanical and/or magnetic sources may also be used. In the depicted embodiment, an electric motor is provided and oriented along an axis 76. The motor axis 76 is perpendicular to the input shaft axis 70 and power take off output shaft axis 72. The motor 74 may also be located outside of the power take off housing 66.

An output shaft 78, connected to the motor 74, extends through an output end of the motor 74. The shaft 78 is aligned with the motor axis 76. A gear 80 is secured to the shaft 78 for rotation therewith.

The motor 74 may be adapted to turn in both a clockwise and a counterclockwise direction. A controller (not shown) signals the motor 74 when to turn and in what direction the motor 74 should turn in. The controller may be such an electronic controller connected to the motor 74.

The motor gear 80 is part of a reduction gear system 82 that also comprises a first intermediate gear 84. The motor gear 80 is in meshed engagement with the first intermediate gear 84.

The first intermediate gear 84 may be larger in diameter than the motor gear 80. The increased diameter size of the first intermediate gear 84 compared with the motor gear 80 results in a reduction in the revolutions per minute of the first intermediate gear 84 compared with the motor gear 80.

The first intermediate gear 84 is mounted for rotation within the power take off housing 66. The first intermediate gear 84 rotates about an axis 86 that is parallel to the axis 76 of the motor 74.

The reduction gear system 82 also comprises a second intermediate gear 88. The second intermediate gear 88 rotates about the same axis 86 as the first intermediate gear 84. The second intermediate gear 88 may be located above the first intermediate gear 84. The first and second intermediate gears 84, 88 may be mounted to one another or they may be separate. If the gears 84, 88 are separate a means for one to drive the other is preferred.

The second intermediate gear 88 may have an outer diameter that is reduced compared to the first intermediate gear 84. Therefore, the number of revolutions per minute of the second intermediate gear 88 compared with the first intermediate gear 84 is increased.

The gear reduction system 82 may be comprised of greater or fewer gears than depicted in the figure, and of the gears selected, the sizes and number or type of teeth may vary from what is shown.

A lever arm 90 is provided with a first end portion 92 and a second end portion 94. The first end portion 92 terminates in an edge 96. Preferably, the edge 96 is curvilinear; most preferably, it is arc-shaped. The width of the edge 96 may be greater than the diameter of the second intermediate gear 88, as shown in the Figures. The width of the edge 96 may be less than, equal to or greater than the diameter of the first intermediate gear 84. The thickness of the edge 96 may be approximately that of the second intermediate gear 88.

A plurality of teeth 98 may define the lever arm edge 96. The teeth 98 are directly engaged with teeth 100 on the second intermediate gear 88.

The lever arm first end portion 92 extends to the second end portion 94 in a bar-like fashion. The second end portion 94 is unitary, one-piece and integrally formed with a shift fork 102. The shift-fork 102 comprises a C-shaped portion 104 where one of the legs of the C is elongated and comprises the lever arm.

The shift fork 102 thus comprises the lever arm as a lower leg 106, an upwardly extending portion 108 and an upper leg 110 all of which are unitary, one-piece and integrally formed with one another. The shift fork 102 also comprises an inner hemispherical surface 112, which partially defines the C-shape 104 of the fork 102.

While terms like "upper," "lower," and "upwardly" are used with certain elements above, these terms are not intended to be limiting since the shift fork 102 can be located in any orientation. The terms are merely used for clarification of the shift fork elements depicted in one orientation in the figures.

Figure 3:
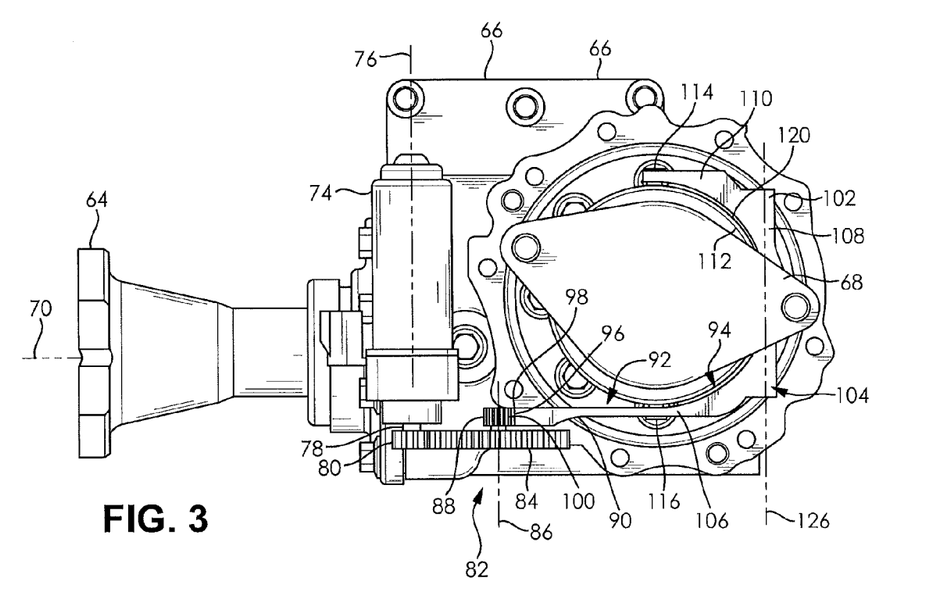
FIG. 3 is a side view of one embodiment of the invention.
Figure 4:
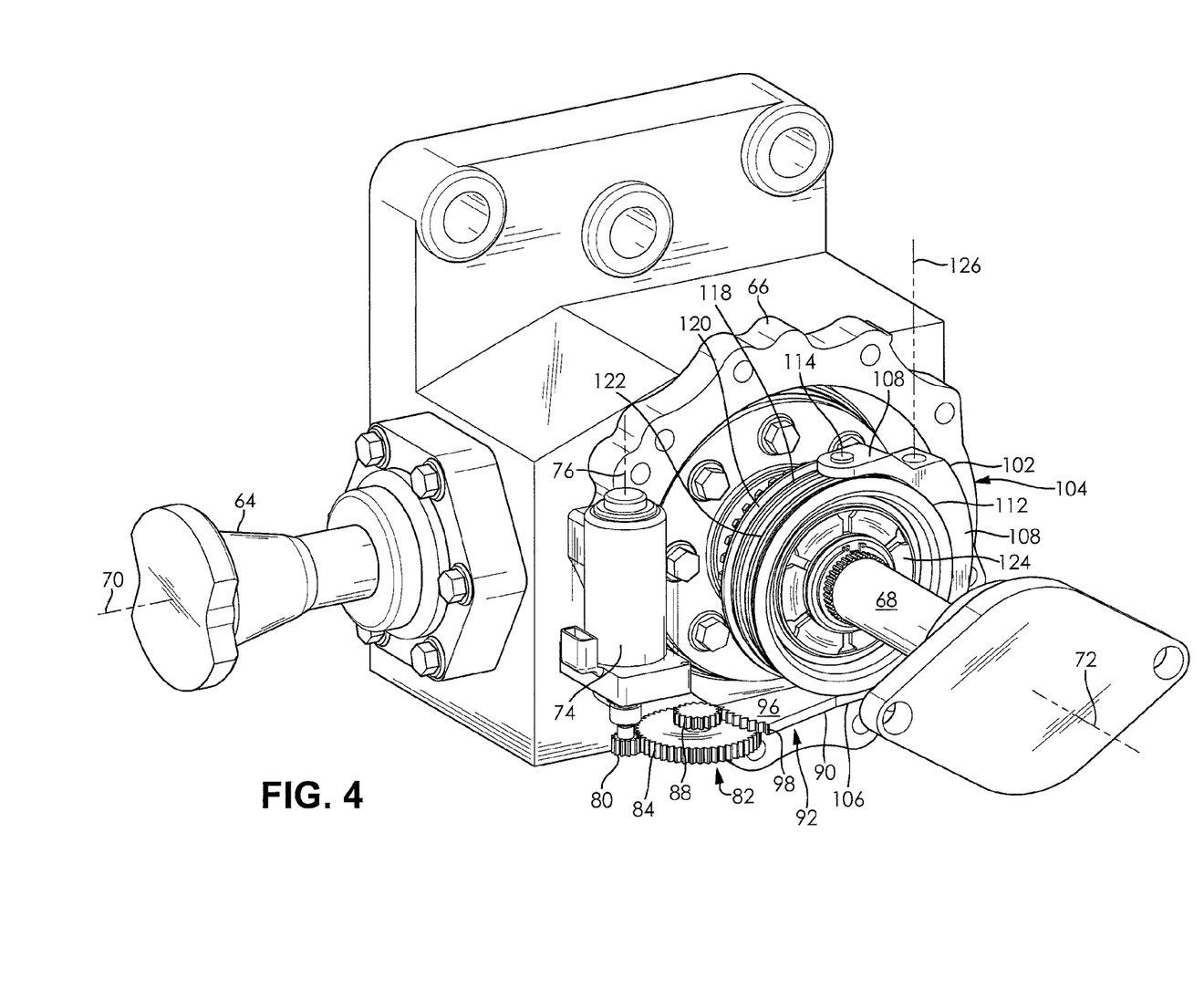
FIG. 4 is a perspective view of the invention of FIG. 3.

At least one shift fork peg is provided in the shift fork 102. Preferably, two shift fork pegs are utilized. A first peg 114 is located in the upper leg 110 of the shift fork 102 and a second peg 116 is located in the lower leg 106 of the shift fork 102. The pegs 114, 116 are preferably axially aligned with one another, as shown in FIG. 3.

The pegs 114, 116 extend through the shift fork 102 and into a groove 118 of a clutch collar 120. The groove 118 may be circumferential, or only partially circumferential, about the collar 120. Preferably, the inner hemispherical surface 112 of the shift fork 102 is complimentary to an outer surface 122 of the clutch collar 120. The outer surface 122 defines the groove 118. Thus, it can be appreciated that, at least partially, the shift fork 102 is externally concentric with the clutch collar 120.

Internally concentric with the clutch collar is a hub structure 124 that locates the collar 120 on to the power take off shaft 68. The hub structure 124 permits the collar 120 to selectively move axially along the power take off shaft 68. The hub structure 124 may be comprised of a splined connection between the hub structure 124 and the shaft 68, or the structure may be comprised of smooth engagement surfaces between the hub structure 124 and the shaft 68 that permit the collar 120 to move along the shaft 68.

The clutch collar 120 is connected to a synchronizer (not shown). Synchronizers are used for matching, or synchronizing, the rotation of two parts that might rotating at different rates, or where one part is rotating and the other is not.

In one embodiment, the synchronizer may be such as a cone synchronizer. A cone synchronizer generally comprises two parts: a selectively rotatable cone-shaped structure, such as a ring, and a complimentary shaped structure. The cone structure may be moved selectively into and out of engagement with the complimentary shaped structure, or vice versa.

It can be appreciated that, for example, if the cone structure is rotating and the complimentary structure is not, as the cone structure is introduced into the complimentary structure, the complimentary structure begins to rotate. As the cone structure is introduced more and more into the complimentary structure, the complimentary structure begins to rotate closer to the speed of the cone structure. If the rotation of the complimentary structure is to be reduced, the cone structure is gradually withdrawn in the same fashion.

The clutch collar 120 may be connected to either the cone structure or the complimentary shaped structure. Thus, it can be appreciated that the clutch collar 120 and the power take off shaft 68 can be selectively engaged and disengaged from the power take off unit 52 for engagement and disengagement of drive for the rear wheels.

The vehicle on which the power take off unit 52 is located has various sensors, programmed software and computers (not shown) to determine when the power take off unit 52 should transfer power to the rear drive wheels 34, 36. In some cases, the operator of the vehicle may make the determination when the rear wheels 34, 36 should be engaged so that vehicle operates in four wheel drive.

Engaging the rear wheels 34, 36 begins with the shift motor 74 receiving a signal to rotate the motor gear 80. The gear 80 rotates causing the first and second intermediate gears 84, 88 to also rotate. The second intermediate gear 88 drives through the arc-shaped toothed surface of the lever arm 90. The lever arm 90 pivots in response to the movement of the second intermediate gear 88. The lever arm 90 pivots about a pivot axis 126 located through the arm 90. The pivot axis 126 is parallel to the motor axis 76 and transverse to the input shaft axis 72 and the second axis 76.

Figure 5:
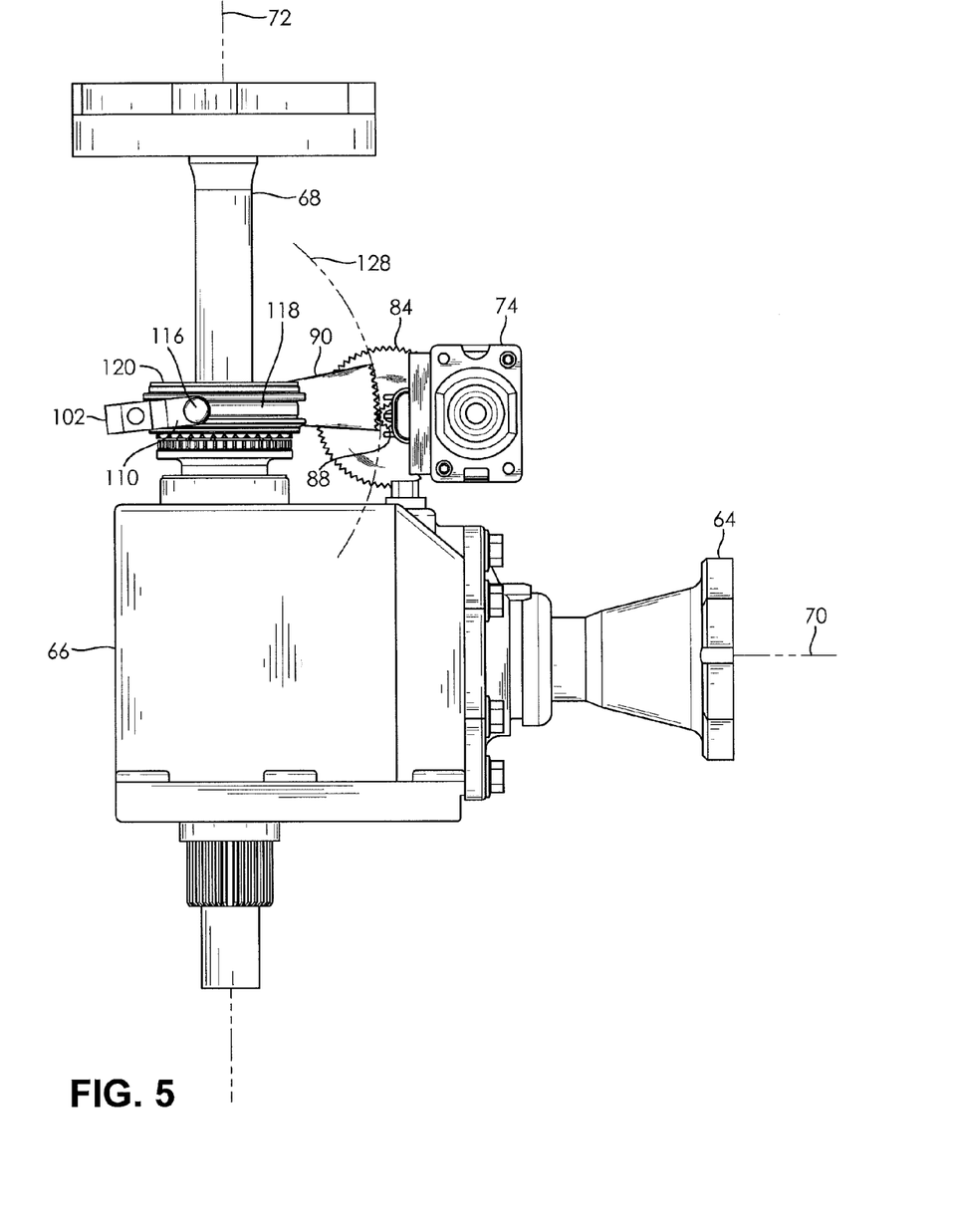
FIG. 5 is a top view of the invention of FIG. 3.
Figure 6:
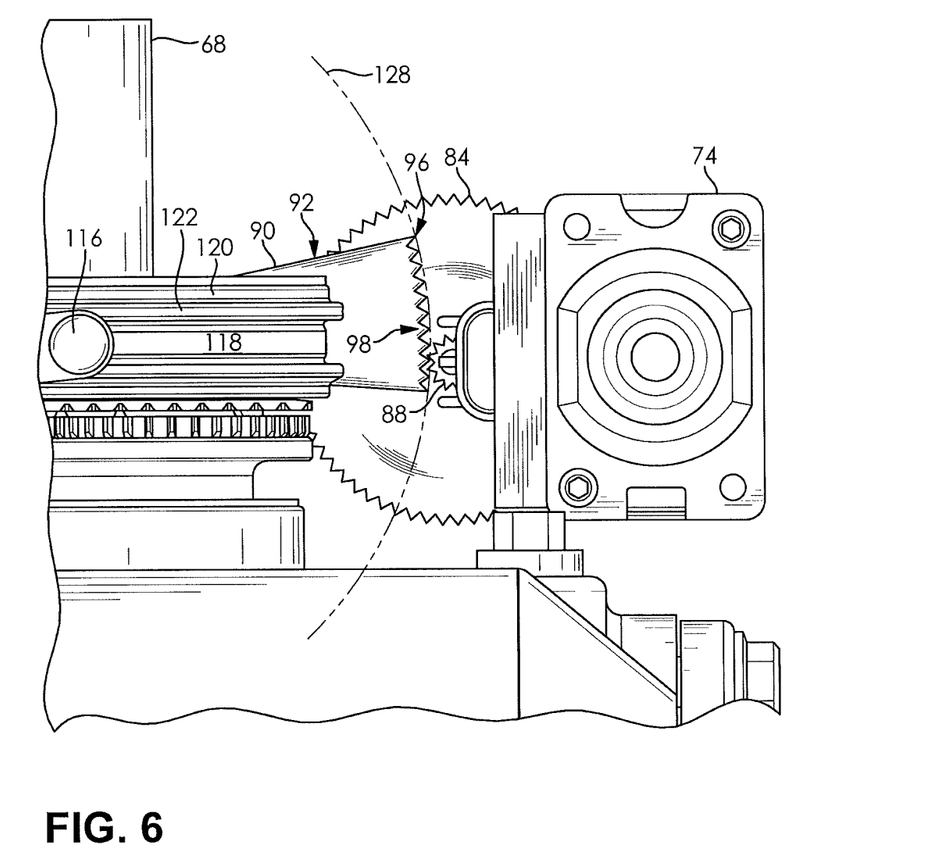
FIG. 6 is a detail view of the invention of FIG. 3.

The lever arm edge 96 moves along an arc 128 as best seen in FIGS. 5 and 6. The lever arm pivot point/axis 126 can also be more clearly appreciated in FIG. 5.

The pivot action of the lever arm 90 and the shift fork 10 axially slides the clutch collar 120 to engage the synchronizer. Rotation transfers through the synchronizer resulting in the rotation of the power take off output shaft 68.

Disconnecting the drive to the rear wheels 34, 36 begins with the shift motor 74 receiving a signal to rotate in the opposite direction. The motor gear 80 rotates in the second direction, which rotates the first and second intermediate gears 84, 88. The second intermediate gear 88 drives back across the arc-shaped toothed edge 92 of the lever arm 90. The clutch collar 120 pivots about the pivot axis away from the synchronizer, thus disengaging the drive.

Based on the foregoing, it can be appreciated that the amount of space required to accommodate the lever arm 90, the clutch collar 120 and the movement of both is reduced compared with prior art designs. Additionally, it can be appreciated that because the entire clutch collar 120 does not have to be axially moved, but just a portion has to be pivoted, that the size of the motor required to do the moving can be reduced. Further, the lever arm 90 provides a mechanical advantage that the prior art designs did not have to move the clutch collar 120. The motor 74, and the other components, may therefore be smaller and lighter weight than the prior designs. Lastly, because the lever arm 90 accentuates the movement received by the reduction gears 84, 88, the clutch collar 120 is moved relatively quickly into and out of position resulting a fast clutch engagement and disengagement.

Figure 7:
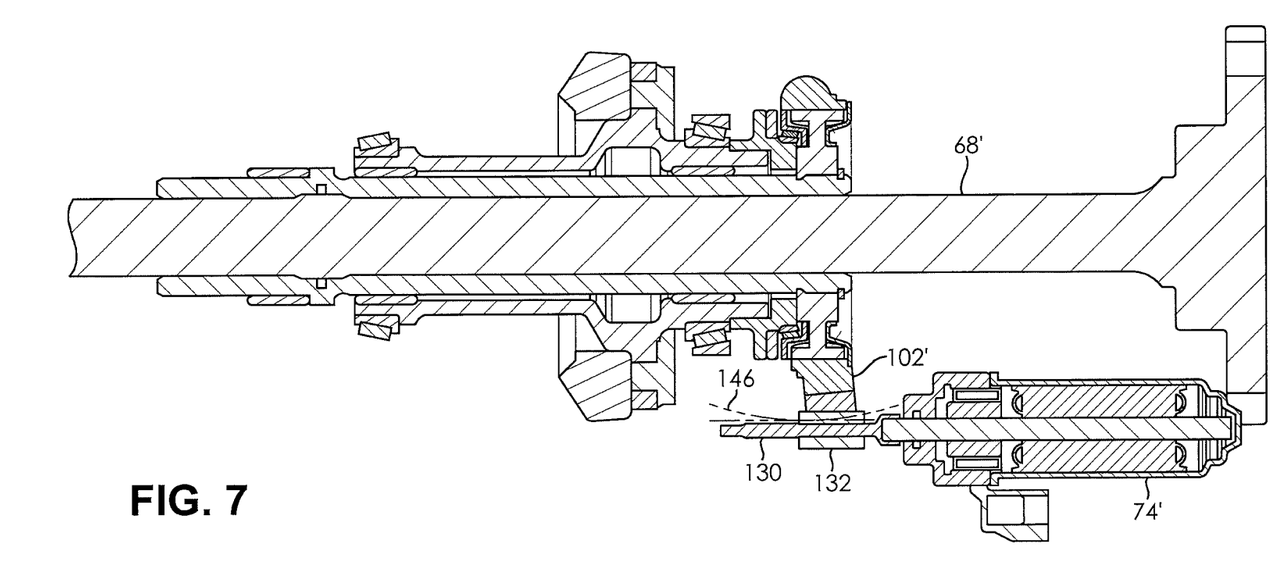
FIG. 7 is a partial cross-section side view of another embodiment.
Figure 8:
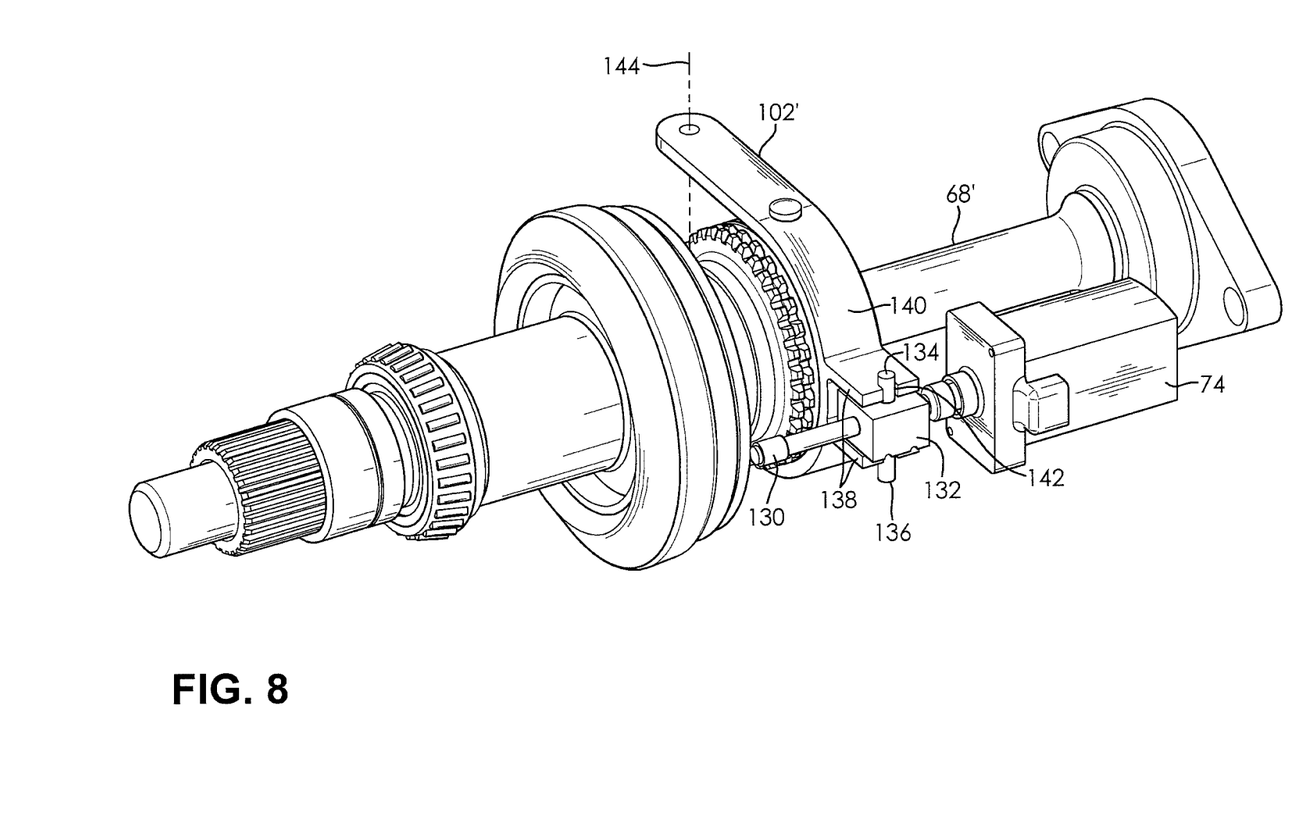
FIG. 8 is a perspective view of the embodiment of FIG. 7

FIGS. 7 and 8 depict an alternative embodiment wherein the shift motor 74' is oriented parallel and planar with the power take off output shaft 68'. The shift motor 74' drives a screw-type gear 130 that extends axially with the shift motor 74'. The screw-type gear 130 extends through a block 132.

The block 132 has threads complementary to the gear 130. The combined screw-type gear 130 and threaded block 132 create a worm gear. The complementary threads of the worm gear effectively lock together when the motor 74' stops turning. This has the advantage of holding the gear 130 with respect to the block 132 in a fixed position, thus the shift fork 102' is also locked in position.

The block 132 is connected to shift fork 102'. In the depicted embodiment, the block 132 has at least one pin extending transversely to the motor axis. Preferably, two pins 134, 136, which are axially aligned with one another, are located within flanges 138 on the shift fork 102'. The flanges 138 extend from an outer surface 140 of the shift fork 102'. The flanges 138 define pin apertures 142 or receiving the block pins 134, 136 therein. The block pins 134, 136 are free to rotate within the pin apertures 142. The shift fork 102' utilizes the pins 134 described above to connect with the clutch collar 120'.

It can be appreciated that upon rotation of the screw-type gear 130 in a first direction, the block 132 is moved away from the motor 74'. The clutch 120 follows the block 132 resulting in the collar 120' moving away from the synchronizer. The synchronizer is thus disengaged. The collar 120' pivots about a pivot point 144, which is opposite the flanges 138. The arc 146 traveled by the flanges 138 can be appreciated by FIG. 7. Upon rotation of the screw-type gear 130 in a second opposite direction, the block 132 is moved toward the motor 74. The clutch collar 120' follows the block 132 resulting in the collar 120' moving toward the synchronizer. The synchronizer is thus engaged. The flanges 138 travel along the same arc 128 and pivot about the same pivot point 144.

The connection of the block 132 and collar 120' creates a lever arm, thus providing a mechanical advantage for moving the clutch collar 120'. The mechanical advantage provided by the lever arm means that the motor 74' does not have to be as large to move the clutch collar 120' compared with prior art designs. The space reduction means that the entire system can be located in a smaller envelope. The space reduction and small motor translate to lighter weight. Lastly, because the lever arm accentuates the movement received by motor 74', the clutch collar 120' is moved relatively quickly into and out of position resulting a fast clutch engagement and disengagement.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

The invention claimed is:

1. A shifting mechanism, comprising:
   a unitary shift fork comprising a lower lever arm, an upright portion having an inner hemispherical surface and an upper arm, said lower lever arm and said upper arm having apertures for receiving pegs that extend therethrough, said lower lever arm having a toothed, arc-shaped end, where said lower lever arm is longer than said upper arm, said upright portion defining a pivot axis for said shift fork;
   an axially slidable clutch collar which has a curved outer surface that is complementary in shape to said inner hemispherical surface of said unitary shift fork;
   a first peg that extends through said upper arm and a second peg that extends through said lower arm to engage with said clutch collar; and
   at least one reduction gear drivingly engaged with both said lower lever arm and a shift motor.

2. The shifting mechanism of claim 1, wherein said shift motor has a shaft extending therefrom, a gear attached for rotation with said shaft, wherein said motor, shaft and gear are aligned with a first axis.

3. The shifting mechanism of claim 2, further comprising an input shaft having a second axis, said input shaft extending into a power take off housing, a power take off shaft extending from said power take off housing along a third axis, wherein said second and third axis are perpendicular to one another, and said first axis is perpendicular to both said second and third axis.

4. The shifting mechanism of claim 2, wherein said gear on said shift motor is in direct driving engagement with said at least one reduction gear, said at least one reduction gear comprising a first intermediate gear and a second intermediate gear, wherein said first intermediate gear is planar with said gear on said shift motor shaft and said second intermediate gear is nonplanar with said gear on said shift motor shaft and said first intermediate gear.

5. The shifting mechanism of claim 4, wherein said second intermediate gear is in direct mesh with said toothed, arc-shaped end of said lower lever arm.

6. The shifting mechanism of claim 1, wherein said first shift fork peg extends through said lower lever arm and into a groove within said clutch collar.

7. The shifting mechanism of claim 6, wherein said second shift fork peg extends through said upper arm and into a groove within said clutch collar.

8. The shifting mechanism of claim 7, wherein said first shift fork peg and said second shift fork peg are axially aligned with one another.

9. The shifting mechanism of claim 3, wherein said clutch collar is axially slidable along said power take off shaft.

10. A method for selectively engaging a power take off shaft, comprising:
energizing a motor to turn a motor gear axially aligned with said motor, said motor gear providing rotation to a reduction gear system;
driving a shift fork through an arc of motion by engaging an arc-shaped end portion of said shift fork having a plurality of teeth with said gear reduction system, wherein said shift fork comprises an upright portion, an upper arm and a lower lever arm that is longer than said upper arm; and
pivotally connecting said shift fork with at least one peg to said clutch collar to slidably move said clutch collar along a power take off shaft.

11. The method of claim 10, wherein said reduction gear system meshes a first intermediate gear into driving engagement with a motor gear, and meshes a second intermediate gear into driving engagement with said arc-shaped end portion of said shift fork.

12. The method of claim 10, wherein rotation of said motor gear causes said gear reduction system to drive across said moveable arc-shaped end portion of said shift fork to pivot said shift fork.

13. The method of claim 11, wherein said shift fork pivots about a pivot axis extending vertically through an upright portion of said shift fork, said upright portion being unitary, but transverse with, an upper arm and a lower arm of said shift fork.

14. The method of claim 10, wherein said pegs push or pull said clutch collar along said power take off shaft upon engagement of said motor.

15. The method of claim 14, wherein rotation of said motor gear in a first direction, pulls said clutch collar in a first direction along said power take off shaft, and rotation of said motor gear in a second direction, pushes said clutch collar in a second direction along said power take off shaft.

* * * * *